(12) United States Patent
Ziemba et al.

(10) Patent No.: US 6,637,191 B1
(45) Date of Patent: Oct. 28, 2003

(54) METHOD AND SYSTEM FOR DIAGNOSING A SECONDARY AIR SUPPLY FOR AN INTERNAL COMBUSTION ENGINE

(75) Inventors: Gregory Ziemba, Grosse Pointe Woods, MI (US); Daniel V. Orzel, Westland, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/065,820

(22) Filed: Nov. 22, 2002

(51) Int. Cl.$^7$ ................................................. F01N 3/22
(52) U.S. Cl. .......................... 60/274; 60/277; 60/289; 73/118.1
(58) Field of Search ..................... 60/274, 276, 277, 60/289; 73/118.1

(56) References Cited

U.S. PATENT DOCUMENTS

| 5,119,631 A | 6/1992 | Kayanuma et al. ........... 60/274 |
| 5,333,446 A | 8/1994 | Itoh ............................. 60/274 |
| 5,388,401 A | * 2/1995 | Nishizawa et al. ............ 60/274 |
| 5,542,292 A | 8/1996 | Schneider et al. .......... 73/118.1 |
| 5,706,653 A | 1/1998 | Shoji et al. .................... 60/276 |
| 5,782,086 A | 7/1998 | Kato et al. ..................... 60/274 |
| 5,822,976 A | 10/1998 | Cockerill ....................... 60/274 |
| 5,974,790 A | 11/1999 | Adamczyk et al. ........... 60/274 |
| 6,393,833 B2 | 5/2002 | Mizoguchi .................... 60/289 |

* cited by examiner

*Primary Examiner*—Tony M. Argenbright
(74) *Attorney, Agent, or Firm*—Julia Voutyras; Daly, Crowley & Mofford, LLP; Allan J. Lippa

(57) ABSTRACT

A method for diagnosing operational performance of a secondary air system used in an internal combustion engine. The engine produces exhaust gases. The exhaust gases pass through a catalytic converter. The engine includes an exhaust gas oxygen sensor. The secondary air system introduces air into the exhaust gas after engine start-up. The oxygen sensor produces a feedback control signal during a feedback mode for adjusting engine operating air-fuel ratio, such feedback mode being initiated at a first time. The method determines from the signal produced by the exhaust gas oxygen sensor a second time relative to the first time when the oxygen sensor signal indicates that a predetermined exhaust gas air fuel ratio is produced. The operational performance of the secondary air system is diagnosed as a function of the determined second time.

8 Claims, 3 Drawing Sheets

METHOD AND SYSTEM FOR DIAGNOSING A SECONDARY AIR SUPPLY FOR AN INTERNAL COMBUSTION ENGINE

BACKGROUND OF INVENTION

1. Technical Field

This invention relates to a method and system for diagnosing a secondary air supply used in an internal combustion engine and more particularly to non-invasive methods and systems adapted to provide an indication of whether threshold emission levels are being exceeded.

2. Background

As is known in the art, an internal combustion engine emits exhaust gas consisting of products from the combustion of the air/fuel mixture added to the engine. Fuel is a mixture of chemical compounds, termed "hydrocarbons" (HC). The various fuel compounds are a combination of hydrogen and carbon. Under perfect combustion conditions, the hydrocarbons would combine in a thermal reaction with the oxygen in the air to form carbon dioxide ($CO_2$) and water ($H_2O$). Unfortunately, perfect combustion does not occur and in addition to $CO_2$ and $H_2O$, carbon monoxide (CO), oxides of nitrogen ($NO_x$), and hydrocarbons (HC) occur in the exhaust gas as a result of the combustion reaction. Additives and impurities in the fuel also contribute minute quantities of compounds such as lead oxides, lead halogenides, and sulfur oxides. Therefore, federal statutes have been enacted to regulate the allowable amount of HC, $NO_x$, and CO emitted from a vehicle's engine.

The greatest effects on the combustion process, and therefore on the exhaust emissions, is the mass ratio of air to fuel. The air/fuel ratio must lie within a certain range for optimal ignition and combustion. For an internal combustion engine, the mass ratio for complete fuel combustion is approximately 14.7:1; i.e., 14.7 kilograms of air to 1 kilogram of fuel. This ratio is known as the stoichiometric ratio. In terms of volume, approximately 10,000 liters of air is required for 1 liter of fuel.

When the fuel mixture contains excessive fuel, or is running rich, CO emissions increase almost linearly with the increasing amount of fuel. However, when the fuel mixture contains excessive oxygen, or is running lean, CO emissions are at their lowest.

As with CO emissions, HC emissions increase with an increasing amount of fuel. At very lean air/fuel ratios, the HC emissions increase again due to less than optimal combustion conditions resulting in unburned fuel.

The effect of the air/fuel ratio on $NO_x$ emissions is the opposite of HC and CO on the rich side of stoichiometry. As the air content increases, the oxygen content increases and the result is more $NO_x$. However, on the very side of stoichiometry, $NO_x$ emissions decrease with increasing air because the decreasing density lowers the combustion chamber temperature.

To reduce the exhaust gas emission concentration, a catalytic converter is typically installed in the exhaust system of an internal combustion engine. Chemical reactions occur in the converter that transform the exhaust emissions to less harmful chemical compounds. The most commonly used converter for an internal combustion engine is the three-way converter (TWC). As the name implies, it simultaneously reduces the concentration of all three regulated exhaust gases: HC, CO, and $NO_x$. The catalyst promotes reactions that oxidize HC and CO, converting them into $CO_2$ and $H_2O$, while reducing $NO_x$ emissions into $N_2$. In order for the catalytic converter to operate at the highest efficiency for conversion for all three gases, the average air/fuel ratio must be maintained within less than 1% of stoichiometry.

Typically, automobile manufacturers utilize an exhaust gas oxygen sensor in the electronic engine control system to maintain stoichiometric air/fuel ratio. This sensor is installed in the exhaust system upstream of the catalytic converter and responds to the oxygen content in the exhaust gas. The oxygen content is a measure of the excess air (or a deficiency of air) in the exhaust gas. The output of the sensor is a measure of the air/fuel ratio of the exhaust gas. Automobile manufacturers also utilize a secondary air pump to reduce the emission of CO and HC. The air pump is controlled by the electronic engine controller (EEC).

Currently, the air pump turns on during engine idle specifically for testing the functional operation of the secondary air system. More particularly, during idle, fuel into the engine is controlled and the air pump is turned on. An exhaust gas oxygen sensor disposed upstream of the catalyst is used to detect whether the secondary air system is operating properly. This invasive method requires special fueling conditions that may increase engine emissions.

In an effort to improve engine emission performance, new legal requirements require that the secondary air system performance be monitored while the pump is active at startup (i.e., a non-invasive system) and to notify the driver when secondary air system performance degrades to the point where vehicle emissions exceed a predetermined threshold.

SUMMARY OF INVENTION

A method is provided for diagnosing operational performance of a secondary air system used in an internal combustion engine. The engine produces exhaust gases. The exhaust gases pass through a catalytic converter. The engine includes an exhaust gas oxygen sensor. The secondary air system introduces air into the exhaust gas after engine start-up. The oxygen sensor produces a feedback control signal during a feedback mode for adjusting engine operating air-fuel ratio, such feedback mode being initiated at a first time. The method determines from the signal produced by the exhaust gas oxygen sensor a second time relative to the first time when the oxygen sensor signal indicates that a predetermined exhaust gas air fuel ratio is produced. The operational performance of the secondary air system is diagnosed as a function of the determined second time.

With such method a non-invasive secondary air supply diagnostic method is provided. Further, the method is able to notify the driver when system performance degrades to the point where vehicle emissions exceed a predetermined threshold.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference symbols in the various drawings indicate like elements.

DETAILED DESCRIPTION

Figure 1:
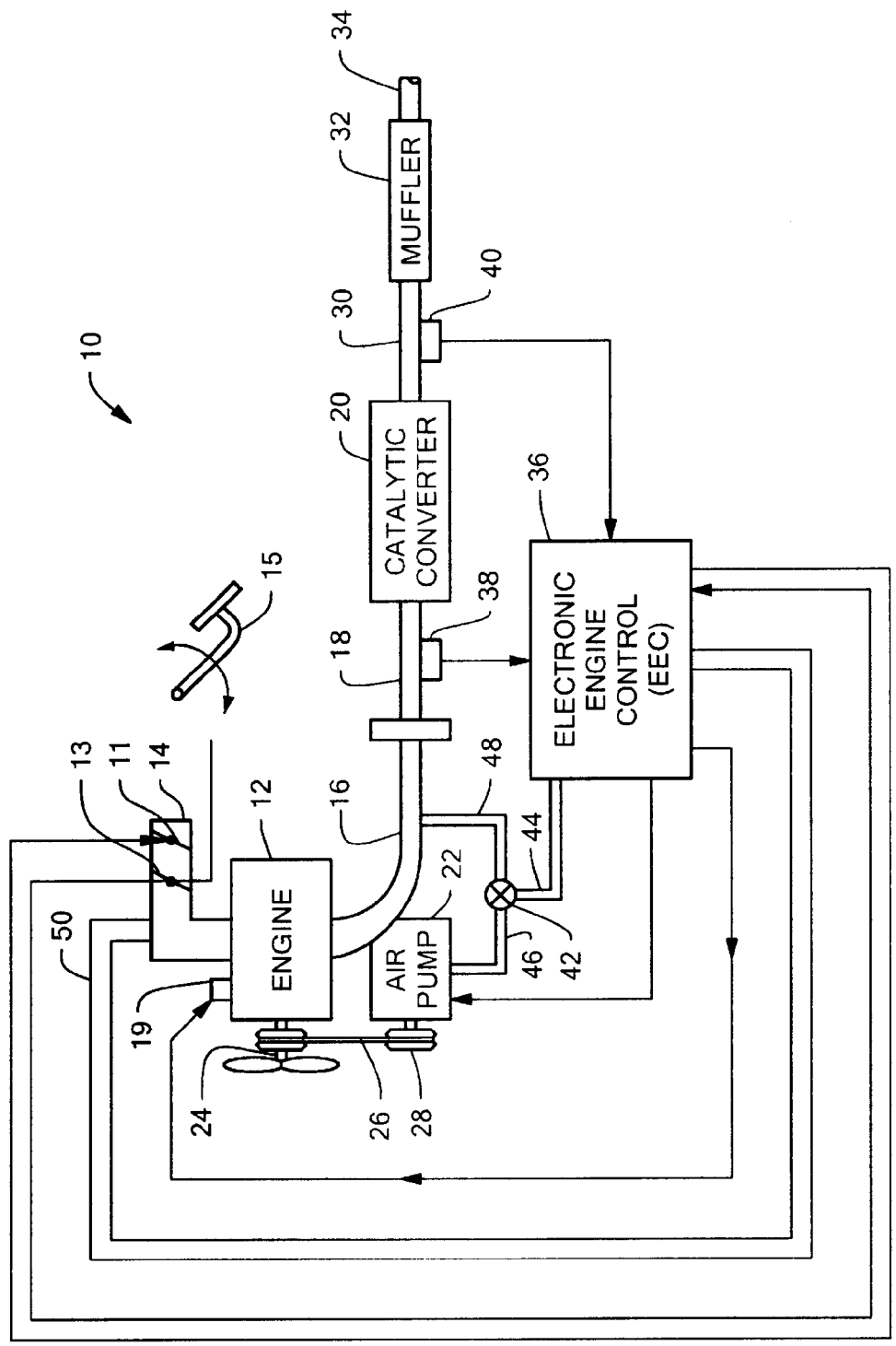
FIG. 1 is diagram of an internal combustion engine system adapted to diagnose a secondary air supply according to the invention.

Referring now to FIG. 1, a block diagram of the system of the present invention is shown, denoted generally by reference numeral 10. The system 10 includes an internal combustion engine 12 having an intake manifold 14 and an exhaust manifold 16.

Primary air is drawn into the intake manifold 14 and flows through a duct into an air flow valve 11. The air flow valve 11 is a hinged plate that opens and closes as necessary to maintain the correct quantity of primary air flowing into the engine 12. Primary air flow is monitored and maintained using a throttle valve 13. The throttle valve 13 is controlled by an accelerator pedal 15 either directly, as shown, or electronically in the case of an electronically controlled throttle (ETC) and generates a corresponding throttle valve position signal.

As the engine 12 burns a fuel mixture, the burnt air/fuel mixture is exhausted from the engine 12 into the exhaust manifold 16. From the exhaust manifold 16, the untreated exhaust gases flow through an exhaust pipe 18 into a catalytic converter 20. The catalytic converter 20 treats the exhaust gases by converting the hydrocarbons (HC), carbon monoxide (CO), and nitrogen oxides ($NO_x$) into water vapor, carbon dioxide, and nitrogen respectively.

The treated exhaust gases—water vapor, carbon dioxide, and nitrogen—are expelled from the catalytic converter 20 through a rear exhaust pipe 30, muffler 32 and tailpipe 34. The system 10 also includes an air pump 22 as part of a secondary air system for adding secondary air to the untreated exhaust gas in the exhaust manifold 16 to reduce the emissions of CO and HC. This reaction in turn will warm the catalytic convert 20 to its operating temperature quicker. The air pump 22 is may be clutch-driven using a crankshaft 24 of the engine 12, a belt 26 and a pulley 28, as shown, or may be electronically controlled.

The system 10 further includes an Electronic Engine Control (EEC) 36. The EEC 36 functions to maintain the proper mixture of air and fuel needed for the car's driving conditions through a fuel control system, i.e., a fuel injection program stored in the EEC 36. The EEC thus supplies a fuel control signal to the engines fuel injectors 19, only one being shown it being understood that there is one fuel injector for each cylinder in the engine The EEC 36 is coupled to the air pump 22 for cycling the air pump 22 ON and OFF. In the case of an ETC system the EEC provides the electronic control signal to the throttle system 13.

Also coupled to the EEC 36 are a first oxygen sensor 38 and a second oxygen sensor 40 for generating a first and second oxygen feedback signal to the EEC 36, respectively. The first oxygen sensor 38 is located upstream of the catalytic converter 20 and senses the untreated exhaust gas in the exhaust pipe 18. The second oxygen sensor 40 is located downstream of the catalytic converter 20 and senses the treated exhaust gas in the rear exhaust pipe 30. The first and second oxygen sensors 38, 40 are typical Heated Exhaust Gas Oxygen (HEGO) sensors known by those having ordinary skill in the art. If the first and second oxygen sensors 38, 40 generate an oxygen feedback signal indicating there is minimum oxygen in the exhaust gas, the fuel mixture being provided to the engine 12 is rich. Conversely, if the oxygen feedback signal indicates there is excessive oxygen in the exhaust gas, the fuel mixture being provided to the engine 12 is lean.

An air control valve 42 is also coupled to the EEC 36 via a vacuum conduit 44. The air control valve 42 is a vacuum controlled valve utilized to control the amount of secondary air that is added by the air pump 22 to the exhaust manifold 16 via conduits 46, 48 for optimal emissions based on the feedback signals from the first and second oxygen sensors 38, 40. A conduit 50 coupled between the intake manifold 14 and the EEC 36 provides a vacuum source necessary to operate the air control valve 42.

An ideal stoichiometric fuel mixture of approximately 14.7 parts of air to 1 part of gasoline allows fuel to burn almost completely, thereby producing the least amount of exhaust gases which pollute the atmosphere. However, it may be desirable to run the engine 12 at an air/fuel ratio which is best for the engine based on performance and durability data while maintaining an optimized air/fuel ratio for the treated exhaust gas. For example, it may be desirable to run the engine 12 rich of stoichiometric air/fuel ratio, e.g., 13.5:1, which is optimum for the engine 12, yet maintain an optimum air/fuel ratio after the catalytic converter 20, e.g., 14.7:1. This is accomplished by diluting the untreated exhaust gases in the exhaust manifold 16 with secondary air from the air pump 22.

It may also be desirable to optimize the efficiency of the catalytic converter 20 for converting HC, $NO_x$ and CO into $CO_2$ and $H_2O$. A lean air/fuel ratio selected for the treated exhaust gas results in a low efficiency of the catalytic converter 20 since the emission of $NO_x$ in the treated exhaust gas is increased. Conversely, a rich air/fuel ratio results in a high efficiency of the catalytic converter 20 since the emission of CO and HC in the treated exhaust gas is at a minimum.

Figure 2:
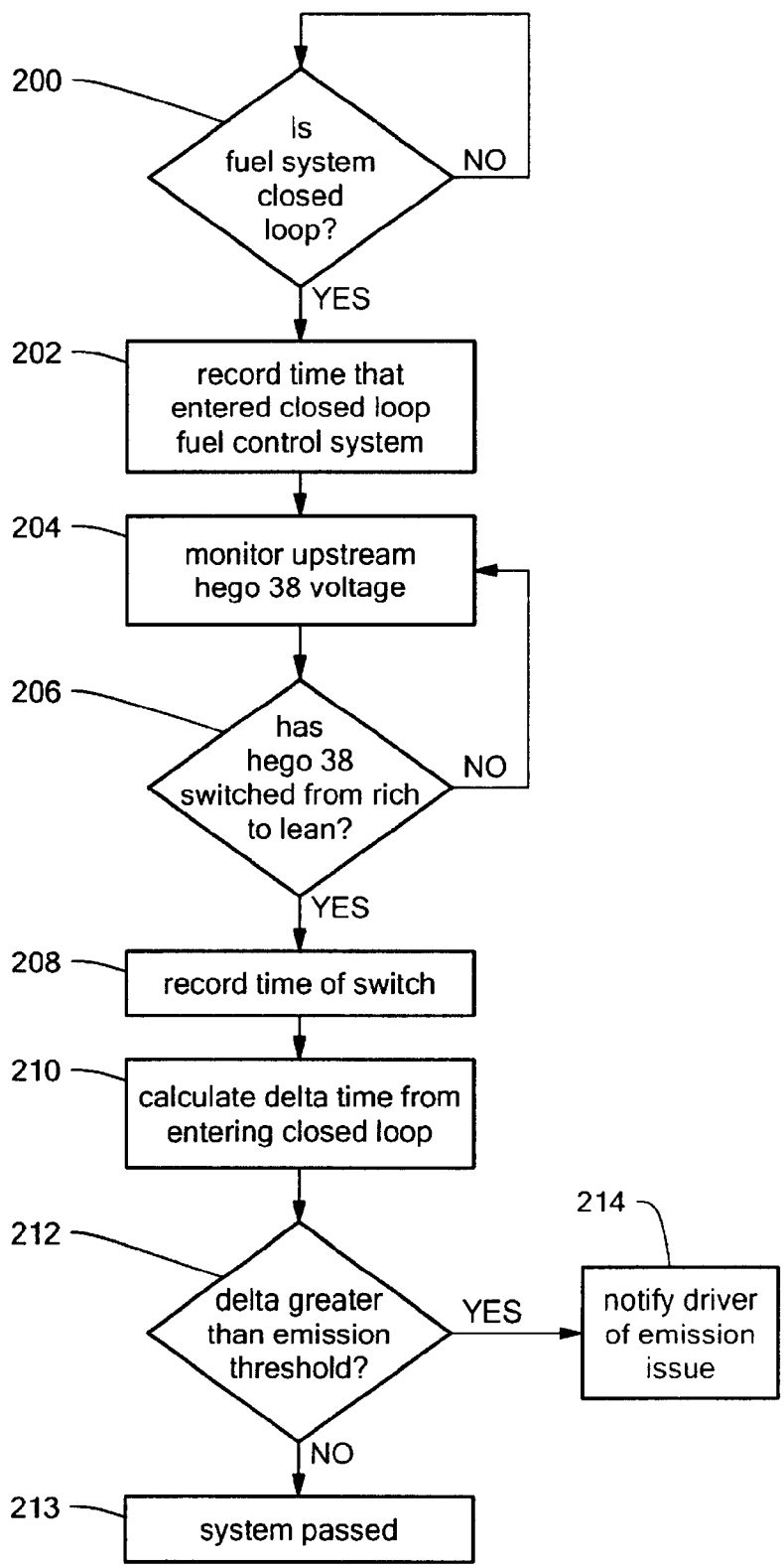
FIG. 2 is a flow diagram of the process used by the engine system of FIG. 1 to diagnose the secondary air supply used by such engine system according to the invention.

Referring now to FIG. 2 a flow diagram is shown for the method used to test, i.e. diagnose the operating performance of the secondary air system. Thus, it is first noted that the process begins each time the engine is started, during a first period of time after start up, here about six seconds after start up, the air pump is turned on and the engine is operated rich of stoichiometry. Further, during this period of time, the fuel control system operates open loop, that is, the signal from the upstream oxygen sensor 38 is not used to control fuel injection into the engine. During a second period of time, here for example between the end of the first period of time and lasting approximately nine seconds (i.e., eighteen seconds after start up in this example), the fuel control system operates in a closed loop condition with the secondary air pump on. In such closed loop condition, or mode, the signal from the upstream oxygen sensor 38 is used to provide a feedback control signal which adjusts the fuel injection into the engine to drive the exhaust gas towards stoichiometry. In accordance with the present invention, the time period is measured between the time the fuel control system switches to the feedback mode until the oxygen sensor indicates that a predetermined exhaust gas air-fuel ratio is produced, here in this example, when the exhaust gas passes from rich of stoichiometry to lean of stoichiometry. This measured time difference is compared with a predetermined threshold time. If the determined time difference is less than the threshold, the secondary air system is operating properly. If, on the other hand, the determined time difference is greater than the predetermined threshold time, the secondary air system is not operating properly and the driver is notified.

Thus, referring to FIG. 2, in Step 200, a determination is made as to whether the fuel control is in a closed loop mode. The fuel control system is placed in the closed loop mode by the EEC, typically when the upstream oxygen sensor 38 reaches a predetermined temperature.

In Step 202, the time the fuel control system enters the closed loop mode is recorded by the EEC.

In Step 204, the upstream oxygen sensor 38 output is monitored. Here, the predetermined exhaust gas air fuel ratio selected is stoichiometry and thus, a determination is made as to whether the signal from the upstream exhaust gas oxygen sensor 38 switches from rich of stoichiometry to lean of stoichiometry.

In Step 206, a determination is made from the monitored upstream oxygen sensor 38 as to whether the upstream exhaust gas oxygen sensor 38 switches from rich of stoichiometry to lean of stoichiometry. If it switches, the time is recorded when the exhaust gas has gone from rich of stoichiometry to lean of stoichiometry in Step 208.

In Step 210, the difference, delta, between the time the fuel control system switched from an open loop system to the closed loop system (i.e., the first recorded time, Step 202) and the time the air fuel ratio of the exhaust gas switched from rich of stoichiometry to lean of stoichiometry (the second recorded time, Step 208) is compared to a predetermined threshold time, delta_threshold.

In Step 212, if the determined time difference, delta, is less than the predetermined time delta_threshold, the system is operating with emissions less than a predetermined level, Step 213; on the other hand, if the time difference, delta, is greater than the time threshold, delta_threshold, the operator is advised by a suitable light on the dashboard, for example, that the system is operating with emissions above the threshold, Step 214.

Figure 3:
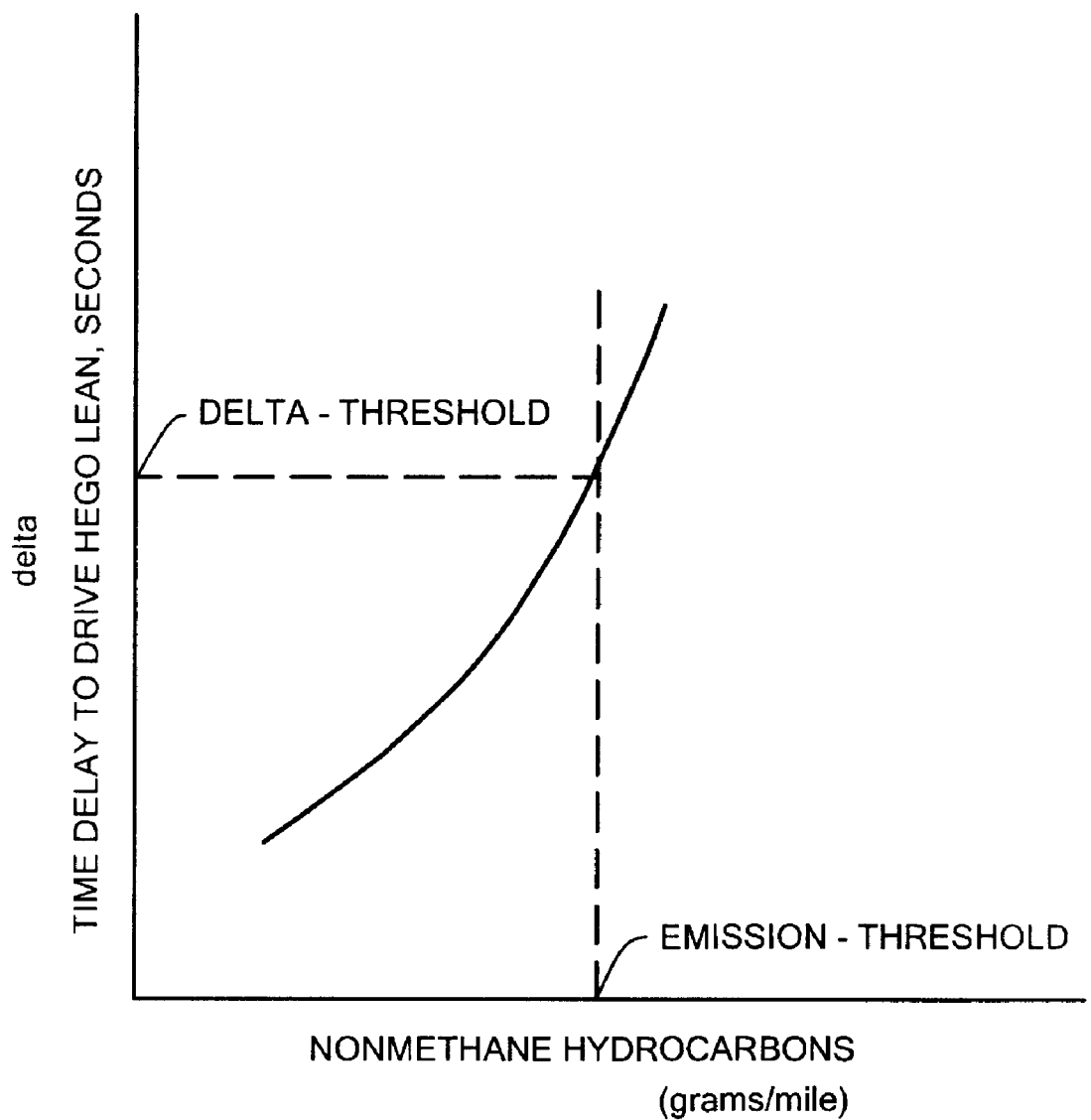
FIG. 3 is a curve showing the relationship between the time delay of a feedback control system of the engine system of FIG. 1 operating the secondary air supply to reduce exhaust gas emission air-fuel ratio from a ratio rich of stoichiometry to an air-fuel ratio lean of stoichiometry and the level of such exhaust gas emissions.

Referring now to FIG. 3, a curve showing the time, delta, it takes after initiation of the feedback mode (i.e., the time the fuel control system is switched from an open loop system to the closed loop system) for the secondary air supply to reduce exhaust gas emission air-fuel ratio from a ratio rich of stoichiometry to an air-fuel ratio lean of stoichiometry as a function of exhaust gas emission level, here for example, non-methane hydrocarbons emissions in grams per mile. This curve is established from a priori established test data. From such curve, delta_threshold, described above in connection with Step 212 of FIG. 2 is established as that time when the allowable emission level is at an allowed threshold level, emission_threshold.

A number of embodiments of the invention have been described. Nevertheless, it will be understood that various modifications may be made without departing from the spirit and scope of the invention. Accordingly, other embodiments are within the scope of the following claims.

What is claimed is:

1. A method for diagnosing operational performance of a secondary air system used in an internal combustion engine, such engine producing exhaust gases, such exhaust gases passing through a catalytic converter, such engine including an exhaust gas oxygen sensor, such secondary air system introducing air into the exhaust gas after engine start-up, such oxygen sensor producing a feedback control signal during a feedback mode for adjusting engine operating air-fuel ratio, such feedback mode being initiated at a first time, such method comprising:

determining from the signal produced by the exhaust gas oxygen sensor a second time relative to the first time when the oxygen sensor signal indicates that a predetermined exhaust gas air fuel ratio is produced; and diagnosing the operational performance of the secondary air system as a function of the determined second time.

2. A method for diagnosing operational performance of a secondary air system used in an internal combustion engine, such engine producing exhaust gases, such exhaust gases passing through a catalytic converter, such engine including an exhaust gas oxygen sensor, such secondary air system introducing air into the exhaust gas after engine start-up, such oxygen sensor producing a feedback control signal during a feedback mode for adjusting engine operating air-fuel ratio, such feedback mode being initiated at a first time, such method comprising:

operating a fuel control system for the engine during a first period of time in an open loop mode wherein a fuel control system of such engine operates independently of a signal produced by the oxygen sensor;

operating the fuel control system for the engine during a second period of time after the end of the first period of time in a closed loop condition wherein the signal from the oxygen sensor is used to provide a feedback control signal for the fuel control system and in response to the oxygen sensor signal such fuel control system adjusts fuel injection into the engine to drive the exhaust gas towards stoichiometry;

measuring the time period between the time the fuel control system switches to the feedback mode until the oxygen sensor indicates that a predetermined exhaust gas air-fuel ratio is produced; and comparing the measured time difference with a predetermined threshold time.

3. The method recited in claim 2 wherein the predetermined exhaust gas air-fuel ratio is when the exhaust gas passes from rich of stoichiometry to lean of stoichiometry.

4. The method recited in claim 2 wherein if the determined time difference is less than the threshold, the secondary air system is operating with emissions less than a predetermined level and wherein if, on the other hand, the determined time difference is greater than the predetermined threshold time, the secondary air system is not operating with emission less than a predetermined level and an operator of the engine is notified.

5. A system for diagnosing operational performance of a secondary air system used in an internal combustion engine, such engine producing exhaust gases, such exhaust gases passing through a catalytic converter, such engine including an exhaust gas oxygen sensor, such secondary air system introducing air into the exhaust gas after engine start-up, such oxygen sensor producing a feedback control signal during a feedback mode for adjusting engine operating air-fuel ratio, such feedback mode being initiated at a first time, such system comprising:

an engine control system programmed to:

determine from the signal produced by the exhaust gas oxygen sensor a second time relative to the first time when the oxygen sensor signal indicates that a predetermined exhaust gas air fuel ratio is produced; and diagnose the operational performance of the secondary air system as a function of the determined second time.

6. A system for diagnosing operational performance of a secondary air system used in an internal combustion engine, such engine producing exhaust gases, such exhaust gases passing through a catalytic converter, such engine including an exhaust gas oxygen sensor, such secondary air system introducing air into the exhaust gas after engine start-up, such oxygen sensor producing a feedback control signal during a feedback mode for adjusting engine operating air-fuel ratio, such feedback mode being initiated at a first time, such system comprising:

a fuel control system for controlling fuel injection into the engine: and an electronic engine controller programmed to:

operate the fuel control system for the engine during a first period of time in an open loop mode wherein the fuel control system of such engine operates independently of a signal produced by the oxygen sensor;

operate the fuel control system for the engine during a second period of time after the end of the first period of time in a closed loop condition wherein the signal from the oxygen is used to provide a feedback control signal for the fuel control system and in response to the oxygen sensor signal such fuel control system adjusts fuel injection into the engine to drive the exhaust gas towards stoichiometry;

measure the time period between the time the fuel control system switches to the feedback mode until the oxygen sensor indicates that a predetermined exhaust gas air-fuel ratio is produced; and compare the measured time difference with a predetermined threshold time.

7. The system recited in claim 6 wherein the predetermined exhaust gas air-fuel ratio is when the exhaust gas passes from rich of stoichiometry to lean of stoichiometry.

8. The system recited in claim 6 wherein if the determined time difference is less than the threshold, the secondary air system is operating with emissions less than a predetermined level and wherein if, on the other hand, the determined time difference is greater than the predetermined threshold time, the secondary air system is not operating with emission less than a predetermined level and an operator of the engine is notified.

* * * * *